(12) United States Patent
Kocikowski et al.

(10) Patent No.: US 12,524,442 B2
(45) Date of Patent: Jan. 13, 2026

(54) DYNAMIC ALLOCATION OF PARTITIONS IN A DISTRIBUTED DATA PROCESSING SYSTEM

(71) Applicant: CLOUDFLARE, INC., San Francisco, CA (US)

(72) Inventors: Mikolaj Kocikowski, Mound, MN (US); Sergii Nuzhdin, New Malden (GB); Gabriele Viglianisi, London (GB); Thomas Walwyn, London (GB)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 18/742,844

(22) Filed: Jun. 13, 2024

(65) Prior Publication Data
US 2025/0384057 A1    Dec. 18, 2025

(51) Int. Cl.
*G06F 16/27* (2019.01)
*G06F 16/2455* (2019.01)

(52) U.S. Cl.
CPC ...... *G06F 16/278* (2019.01); *G06F 16/24568* (2019.01)

(58) Field of Classification Search
CPC .............. G06F 16/24568; G06F 16/278
USPC ........................................................ 707/737
See application file for complete search history.

(56) References Cited

U.S. PATENT DOCUMENTS

| | | | |
|---|---|---|---|
| 10,635,644 B2 | 4/2020 | Theimer et al. | |
| 10,979,363 B2 | 4/2021 | Efimov et al. | |
| 2010/0114889 A1* | 5/2010 | Rabii | G06F 16/1824 |
| | | | 707/E17.032 |
| 2013/0103729 A1* | 4/2013 | Cooney | G06F 16/252 |
| | | | 707/831 |
| 2021/0034598 A1* | 2/2021 | Arye | G06F 16/288 |
| 2023/0315682 A1* | 10/2023 | Liberman | G06F 16/2477 |
| | | | 707/830 |

OTHER PUBLICATIONS

Streaming Data Solutions on AWS, Amazon Web Services, Streaming Data Solutions on AWS, Sep. 13, 2017, 33 pages.
Richard Artoul, Kafka is dead, long live Kafka, WarpStream by CONFLUENT, Jul. 25, 2023, 12 pages, downloaded at: https://www.warpstream.com/blog/kafka-is-dead-long-live-kafka.
Matt Boyle, Using Apache Kafka to process 1 trillion inter-service messages, The Cloudflare Blog, Cloudflare, Jul. 19, 2022, 14 pages, downloaded at: https://blog.cloudflare.com/using-apache-kafka-to-process-1-trillion-messages/.

(Continued)

*Primary Examiner* — Robert W Beausoliel, Jr.
*Assistant Examiner* — Lauren Zannah Ganger
(74) *Attorney, Agent, or Firm* — NICHOLSON DE VOS WEBSTER & ELLIOTT LLP

(57) ABSTRACT

A claim is granted over a partition to a consumer. The claim is valid for a period and allows only that consumer to consume data of the partition during the period. The consumer consumes the data until the claim expires or the data in the partition is fully consumed. If the consumer fully consumes the data of the partition prior to the claim expiring, another claim can be granted over another partition to the consumer. Once the claim over the partition expires, the partition is available to be claimed by another consumer.

19 Claims, 4 Drawing Sheets

(56) References Cited

OTHER PUBLICATIONS

Dunith Danushka, Upgrade your data streaming: a beginner's guide to Redpanda, Redpanda, Jul. 6, 2023, 10 pages, downloaded at: https://www.redpanda.com/blog/data-streaming-with-redpanda.

Mark Papadakis, Core Concepts, phaistos-networks/TANK, GitHub, Inc., Aug. 8, 2016, 3 pages, downloaded at: https://github.com/phaistos-networks/TANK/wiki/Core-Concepts.

Mark Papadakis, Client API, phaistos-networks/TANK, GitHub, Inc., Dec. 1, 2016, 13 pages, downloaded at: https://github.com/phaistos-networks/TANK/wiki/Client-API.

\* cited by examiner

DYNAMIC ALLOCATION OF PARTITIONS IN A DISTRIBUTED DATA PROCESSING SYSTEM

FIELD

Embodiments of the invention relate to the field of computing; and more specifically, to the dynamic allocation of partitions in a distributed data processing system.

BACKGROUND

Distributed data processing systems exist that allow producers and consumers to send and receive data, sometimes referred to as messages. These data streams are organized in groups, sometimes called topics, which are further divided into partitions. For example, a partition can be an ordered log of event messages in which each message is marked with a progressive offset. When an event message is written it is appended to the end of the partition. The partitions of the group, or topic, are stored as log files on disk, which are finite in size. The partitions allow one group file to be broken up into many group files, each of which can be hosted on separate servers.

A cluster of servers, sometimes called broker servers, store and serve the partitions. Each partition can be replicated across multiple brokers for high availability and load balancing. A leader-follower model can be used to manage the replicas of each partition (e.g., one leader and one or more followers).

Messages are consumed by individual consumers or groups of consumers. Each data stream (e.g., topic) can be read by many different consumers. Conventionally, when a consumer starts consuming from a partition, it processes all messages from a selected offset. With a consumer group, the partitions are divided among the consumers in the group. Conventionally, the assignment of partitions to consumers is static. That is, a consumer in a consumer group will be statically assigned to a partition. If there is no data to read for a given partition, the assigned consumer will sit idle polling for data. The static assignment of partitions can lead to an unbalanced resource utilization. For instance, the consumers of a consumer group may be executing on servers that have different processing capabilities, which can lead to some consumers taking longer to process data compared to other consumers. This can cause some consumers to fall behind while other consumers sit idle, which can lead to a head-of-line blocking scenario.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Processing data in a distributed data processing system is described. The distributed processing system includes data streams that are organized in groups, known herein as data stream groups. Each data stream group is further divided into partitions. In an embodiment, the partitions are dynamically allocated among a group of consumers. A particular consumer is granted a claim over a particular partition for a period. During that period, only that consumer can process data from the partition. The consumer processes data from the partition until the data from the partition is fully consumed or the claim expires. After the claim expires, or the data from the partition is fully consumed prior to the claim expiring, the consumer can be granted a claim over another partition for a period. This process is repeated.

Instead of conventionally assigning partitions, the techniques described herein allow partitions to dynamically be assigned with a variable number of partitions and a variable number of consumers. Thus, the consumers can be automatically scaled up or down depending on the processing requirements of the application. Further, the techniques described herein may allow for improved resource utilization across a heterogeneous system that has different resource capabilities. For example, if a consumer in a consumer group runs on a server with lower performance than other consumers in that group (and therefore needs more time to process the data), the flexible and short duration of a partition claim allows other consumers in the group to cover any shortfall. This minimizes a consumer sitting idle with no work to perform.

Figure 1:
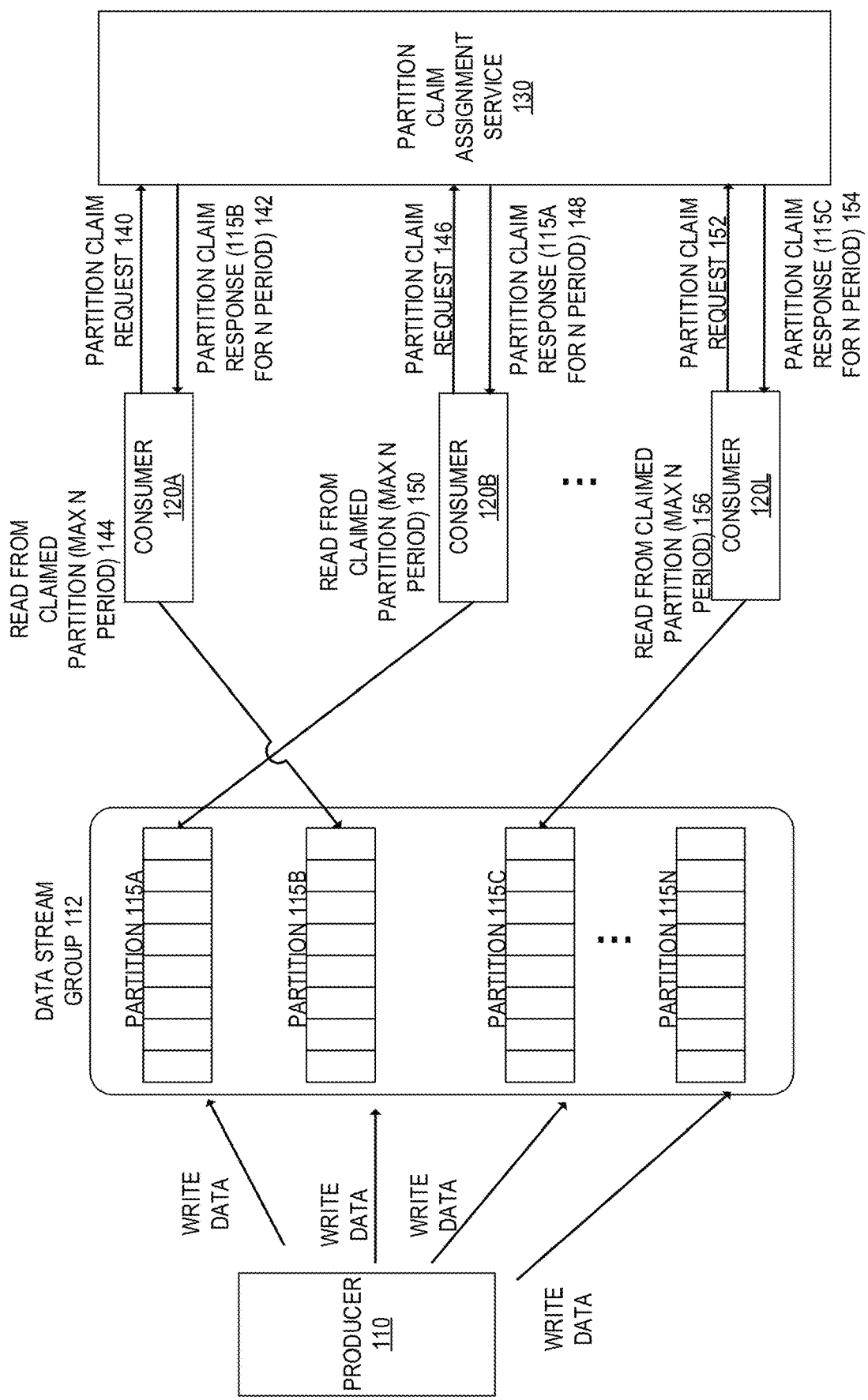
FIG. 1 illustrates a block diagram for an exemplary system for processing data in a distributed system using a dynamic allocation of partitions according to an embodiment.

FIG. 1 illustrates a block diagram for an exemplary system for processing data in a distributed system using a dynamic allocation of partitions according to an embodiment. The system includes a producer 110, multiple partitions 115A-115N, multiple consumers 120A-120L, and a partition claim assignment service 130. The producer 110 is a software component that writes data to the partitions 115A-115N. The consumers 120A-120L are software components that read and process data from the partitions 115A-115N. The partitions 115A-115N are part of the same data stream group 112. The consumers 120A-120L may also read and process data from different partitions. The partitions 115A-115N may be stored and served by a set of servers (sometimes called broker servers). The consumers 120A-L may be executing on a set of servers, which may be different from the broker servers, the same as the broker servers, or have some overlap with the broker servers. These servers are sometimes called consumer servers or nodes.

Each partition 115A-N is a unit of data storage (e.g., a log file) that holds a different portion of data (e.g., a subset of records) belonging to the data stream group 112. As an example, the data stream group 112 may be for a request log (which may be for a particular user or domain); and the partitions 115A-N hold data for the data stream group 112. One or more of the partitions 115A-N may be located at different physical machines of the distributed system (e.g., at different broker servers). The number of partitions 115A-N is exemplary and may be different for different data stream groups. The number of partitions may not be equal to the number of consumers. Also, although a single producer 110 is shown, there may be multiple producers that write data to the partitions 115A-115N. One or more of the consumers 120A-L may be located on different physical machines of the distributed system (e.g., at different consumer nodes).

The partition claim assignment service 130 is a component that handles the assignment of partitions to consumers based on their partition claim requests. Unlike conventional techniques that use static assignment of partitions, the partition claim assignment service 130 uses a dynamic assignment strategy for assigning partitions among the consumers 120A-L. The dynamic assignment of the partitions among the consumers 120A-L can change every N period (e.g., on the order of seconds or minutes). A particular consumer that has been assigned a claim to a partition is the only consumer that is permitted to read data from that partition while the claim is active. The claim may be active only for a fixed period (N). A consumer transmits a partition claim request to the partition claim assignment service for a claim to a partition. The partition claim request indicates the requested data stream group. As an example, with respect to a request log for a domain example.com, a consumer can transmit a partition claim request to the partition claim assignment service 130 for a claim to any available partition (e.g., one that is not currently claimed) for the request log data stream group for the domain example.com. The partition claim assignment service 130 selects an available partition, if any, for the claim, and returns a response that includes the identifier of the claimed partition to the requesting consumer for the granted claim. The claim is only valid for a fixed period. The consumer reads the data from the assigned partition for no longer than the fixed period. In an embodiment, the claim is not released while the period has not expired even if the consumer has consumed all the data in the partition. If the consumer reads and processes all the data in the assigned partition prior to the claim expiring, the consumer may request another available partition to process without releasing the original claim.

In an embodiment, the consumer only reads data that is in the assigned partition at the time the claim is granted. In such an embodiment, the consumer does not read any data that is later added to the assigned partition (e.g., if the producer 110 writes more data to a partition 115).

The consumers can be scaled up or down. For example, if there are no unclaimed partitions to consume, the partition claim assignment service 130 can transmit a message to a consumer indicating that there are no partitions to claim. The consumer then waits an amount of time before requesting another partition. If consumers are not spending any time in this waiting state, the system may add additional consumer (s). If consumers are spending time in the waiting state over a threshold, the system may reduce the number of consumer (s). As another example, if CPU usage across the consumers is stably over a threshold, more consumers are started, typically executing on different servers. If CPU usage across the consumers is below a threshold, the number of consumers may be reduced.

In an embodiment, the number of partitions of the partitions 115A-N is determined dynamically based on the overall demand of the data stream group. For example, each partition may have a predefined limit on the amount of data it can hold (e.g., the number of messages it can hold). If the partition reaches the limit, a second partition can be created to store data for the data stream group, and so on. Likewise, if a partition can be removed if data is not being written to it. In another embodiment, the number of partitions of the partitions 115A-N is determined using a heuristic based on the estimated amount of data to be written to the data stream group.

FIG. 1 illustrates an example of the dynamic allocation of partitions. As shown in FIG. 1, the consumer 120A submits a partition claim request 140 to the partition claim assignment service 130, asking for a claim to an available partition. The partition claim request 140 may not name a specific partition but may indicate the data stream group that a partition should belong to, which in this example is the data stream group 112. The partition claim assignment service 130 replies with the partition claim response 142, granting a claim to the partition 115B to the consumer 120A for a period N, as shown by 144. The period may be a predetermined length of time (e.g., number of seconds or minutes) or represented through an expiration time. While this claim over the partition 115B is active, only the consumer 120A can read from the partition 115B. The consumer 120A can then read data from the partition 115B for a maximum time up to the period. After the period expires or the consumer 120A reads all the data from the partition 115B, the consumer 120A can repeat the process to receive another claim to another partition. After the period expires, the partition claim assignment service 130 can make the partition 115B available to be claimed again by a consumer, which can be a different consumer.

In a similar way, the consumer 120B submits a partition claim request 146 to the partition claim assignment service 130, asking for a claim to an available partition. The partition claim request 146 may not name a specific partition but may indicate the data stream group that a partition should belong to, which in this example is the data stream group 112. The partition claim assignment service 130 replies with the partition claim response 148, granting a claim to the partition 115A to the consumer 120B for a period N, as shown by 150. The period may be a predetermined length of time (e.g., number of seconds or minutes) or represented through an expiration time. While this claim over the partition 115A is active, only the consumer 120B can read from the partition 115A. After receiving the claim, the consumer 120B can then read data from the partition 115A for a maximum time up to the period. After the period expires or the consumer 120B reads all the data from the partition 115A, the consumer 120B can repeat the process to receive another claim to another partition. After the period expires, the partition claim assignment service 130 can make the partition 115A available to be claimed again by a consumer, which can be a different consumer.

In a similar way, the consumer 120L submits a partition claim request 152 to the partition claim assignment service 130, asking for a claim to an available partition. The partition claim request 152 may not name a specific partition but may indicate the data stream group that a partition should belong to, which in this example is the data stream group 112. The partition claim assignment service 130 replies with the partition claim response 154, granting a claim to the partition 115C to the consumer 120L for a period N, as shown by 156. The period may be a predetermined length of time (e.g., number of seconds or minutes) or represented through an expiration time. While this claim over the partition 115C is active, only the consumer 120L can read from the partition 115C. After receiving the claim, the consumer 120L can then read data from the partition 115C for a maximum time up to the period. After the period expires or the consumer 120L reads all the data from the partition 115C, the consumer 120L can repeat the process to receive another claim to another partition. After the period expires, the partition claim assignment service 130 can make the partition 115C available to be claimed again by a consumer, which can be a different consumer.

In an embodiment, a particular claim over a particular partition is not released while the claim has not expired even if the consumer has fully consumed all the data in the partition and has moved on to another partition. This allows data to accumulate in the partition for at least the duration of the claim. In an embodiment, the consumer does not release the claim; but rather it is released automatically upon expiration or released by the partition claim assignment service 130 upon expiration.

The dynamic partition allocation allows the consumers 120A-120L to achieve high throughput and low latency in processing data from the partitions 115A-115N. The dynamic partition allocation can balance the load among the consumers 120A-120L, as each consumer can receive claims for different partitions for different iterations. The dynamic partition allocation can be configurable and customizable, as the fixed period (N) can be set or adjusted according to the needs or configuration of the consumers 120A-120L.

Figure 2:
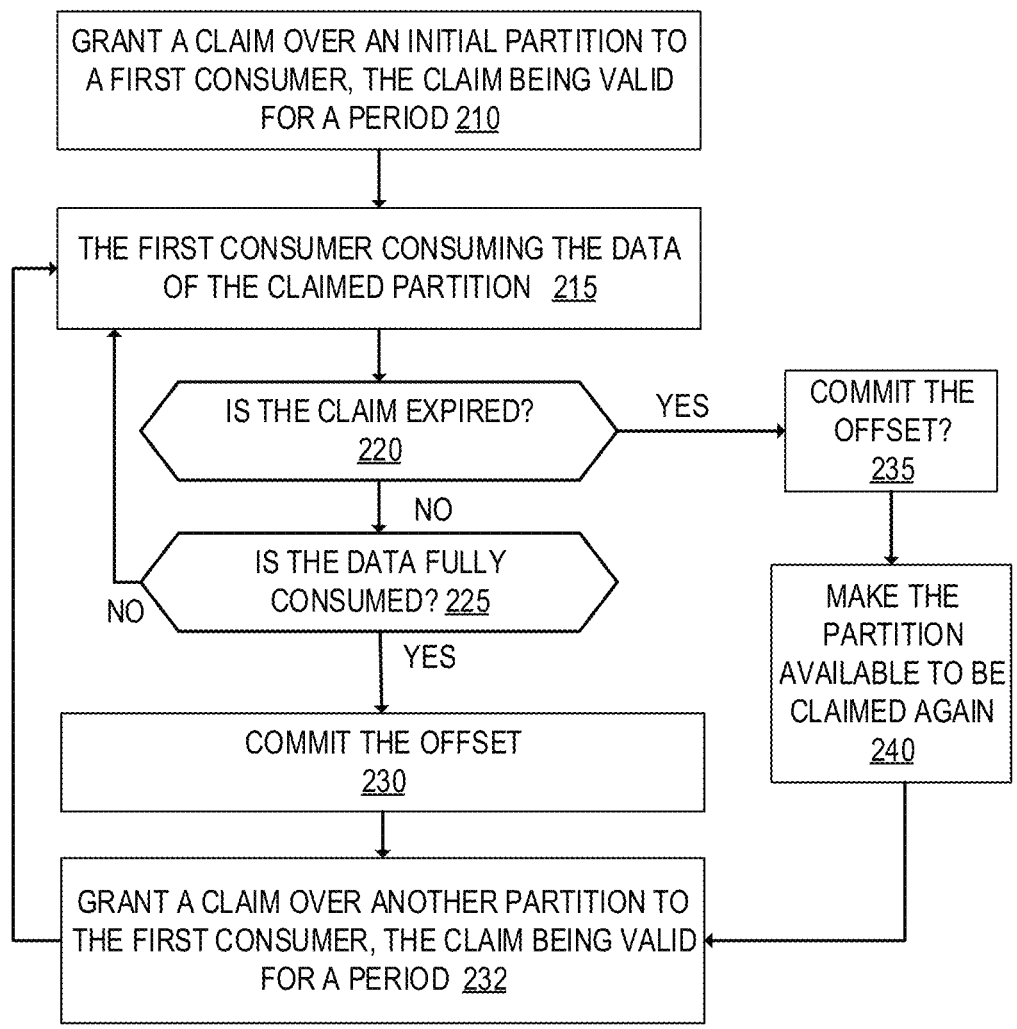
FIG. 2 is a flow diagram that illustrates operations for processing data in a distributed system using a dynamic allocation of partitions according to an embodiment.

FIG. 2 is a flow diagram that illustrates operations for processing data in a distributed system using a dynamic allocation of partitions according to an embodiment. The operations of FIG. 2 are described with respect to the exemplary embodiment of FIG. 1. However, the operations of FIG. 2 can be performed by different embodiments from that of FIG. 1, and the exemplary embodiment of FIG. 1 can perform different operations from that of FIG. 2.

At operation 210, a first consumer 120A of a group of consumers 120A-N claims is granted a claim over an initial partition 115B of a group of partitions 115A-N, where the claim is valid for a period. This claim allows only the first consumer 120A out of the consumers 120A-N to consume data of the partition 115B during the validity of the claim. The period may be for a predefined length of time (e.g., seconds, minutes, hours, etc.) or defined by an expiration time (e.g., a specific time in which the claim expires). The partitions 115A-N are part of the same data stream group 112. The data stream group can be sometimes referred to as a topic or a stream. One or more of the partitions 115A-N may be located at different physical machines of the distributed system. The location of a partition of a data stream group may be identified with a tuple made of an identifier (e.g., a name of the data stream group and the partition) and an identifier of the server that stores the data for the partition.

The granting of the claim over the partition 115B may occur through a request and response mechanism with the partition claim assignment service 130. For example, the consumer 120A can transmit a partition claim request 140 to the partition claim assignment service 130, asking for a claim to an available partition of the data stream group 112. Instead of naming a specific partition, the partition claim request 140 may specify the data stream group that a partition should be part of, which in this example is the data stream group 112. The consumer 120A may request a partition when it is instantiated and periodically while running. The partition claim assignment service 130 in turn determines whether there is an available partition of the data stream group 112 and if so, which partition to assign to the requesting consumer 120A. The partition claim assignment service 130 keeps track of the state of the partitions 115A-N of the data stream group 112. The partition claim assignment service 130 can select an available partition through various techniques such as a round-robin selection, a random selection, or based on policy (e.g., select partition based on server load or server characteristic). The partition claim assignment service 130 returns to the requesting consumer 120A a claim to a partition (e.g., the partition 115B) for a period.

In an embodiment, the partition claim assignment service 130 operates as a central service and centrally manages the state of the partitions 115A-N of the data stream group 112. In such an embodiment, the servers that hold the partitions do not need to agree on a claim. As an alternative to a central service, the partition claim assignment service 130 can operate as a distributed service where each consumer transmits a partition claim request through the partition claim assignment service 130 to each server that has a partition of the data stream group 112. For example, the consumer 120A can transmit a partition claim request to a first server (e.g., a server that is also executing the consumer 120A) for a claim to an available partition of the data stream group 112 and that server returns a claim to an available partition with a condition that the other servers must agree on the claim (e.g., the other servers are not also trying to fulfill a claim for the same partition from a different consumer). The consumer then transmits a partition claim request for that specific partition to the other server(s) that have that specific partition. If each of the other server(s) agree to the claim, the consumer 120A is permitted to consume the data from the assigned partition.

Sometime after receiving the claim, at operation 215, the first consumer 120A begins consuming the data in the assigned partition (e.g., the partition 115B). For example, the first consumer 120A starts at the next sequential message in the partition 115B after the last successfully processed message of the partition 115B (the last successfully processed message determined by the last committed offset for the partition 115B) and determines the key for the data. The first consumer 120A may determine all the keys for the period starting from the keys associated with timestamps after the last committed offset up until the current time of the claim. The first consumer 120A reads the data until the claim expires, or the data is fully consumed. In an embodiment, the first consumer 120A only reads data from the partition for this claim that was already in the partition at the time the claim was granted (i.e., it does not read data from the partition that was written to the partition after the claim was granted). Thus, fully consuming the data in such an embodiment means only the data that was already in the partition at the time the claim was granted. As an example, if the current time is 1020 and the last offset for the partition was committed at 1005, the consumer will determine the keys for records having timestamps between timestamps 1005 and 1020. In another embodiment, the first consumer 120A reads data already included in the partition at the time the claim was granted and data that was written to the partition up until the claim expires. In such an embodiment, fully consuming the data can include data written to the partition after the claim was granted.

At operation 220, the first consumer 120A determines whether the claim has expired. If it has not, then operation 225 is performed; otherwise, operation 235 is performed. At operation 225, the first consumer 120A determines whether the data of the partition is fully consumed (which is prior to the claim expiring). As described previously, fully consumed may be reading only the data that was in the partition prior to the claim being granted; or may include data that was in the partition prior to the claim being granted and data that was written to the partition after the claim was granted. If the first consumer 120A consumes all the data in the first partition prior to the claim expiring, then operation 230 is performed. If there is more data to consume, then operation 215 is performed again where the first consumer 120A continues to consume data.

At operation 230 (the first consumer 120A has fully consumed the data in the partition 115B prior to the claim expiring), the first consumer 120A commits the offset of the last record of the partition 115B that was successfully consumed. The committed offset may be stored in metadata associated with the partition 115B. The first consumer 120A may read the data from each location of the claimed partition 115B (e.g., from each different server that has the claimed partition 115B). In such a case, the first consumer 120A can deduplicate the data (e.g., use one copy at the highest resolution available).

In an embodiment, the first consumer 120A does not release the claim over the partition 115B, if it is still valid, even if the first consumer 120A has consumed all the data in the partition 115B. This allows data to be written to the partition 115B for at least the duration of the claim.

At operation 235 (the claim has expired), the first consumer 120A commits the offset of the last record of the partition 115B that was successfully consumed. The committed offset may be stored in metadata associated with the partition 115B. Next, the partition (e.g., the partition 115B) is made available to be claimed again at operation 240. For example, the claim over the partition is released by the partition claim assignment service 130. The partition 115B may then be able to be claimed by any of the other consumers of the consumer group. The first consumer 120A may be granted a claim over another partition as detailed in operation 232. The operations may flow from operations 235 to operation 232 or from operation 240 to operation 232.

Although not illustrated in FIG. 2, the data that is read from the partition 115B may be provided to, or otherwise made available to, an application or database. For example, the first consumer 120A may read and process the data from the partition 115B, and write the data to a database. In an embodiment, the data is fully read from the partition or until the claim expires prior to sending the data to the application or database. In such a case, the data may be sent to the application or database only after the offsets are committed. In another embodiment, consuming the data in the partition includes reading the data and sending the data to the application or database in parallel with the reading. In such a case, the offsets may be committed when the data is finished being read even if the application or database is processing the data. In such an embodiment, the consumer waits until all the read data has been sent to the application or database before claiming another partition.

At operation 232, the first consumer 120A is granted a claim to another partition in the partition group (e.g., the partition 115N), the claim being valid for a period. The operation 232 is like the operation 210. It is possible, in some embodiments, for the first consumer 120A consume all the data in the partition 115B prior to the claim expiring and for it to be granted another available partition to work on (e.g., the partition 115N), while the claim over the partition 115B is not released.

Figure 3:
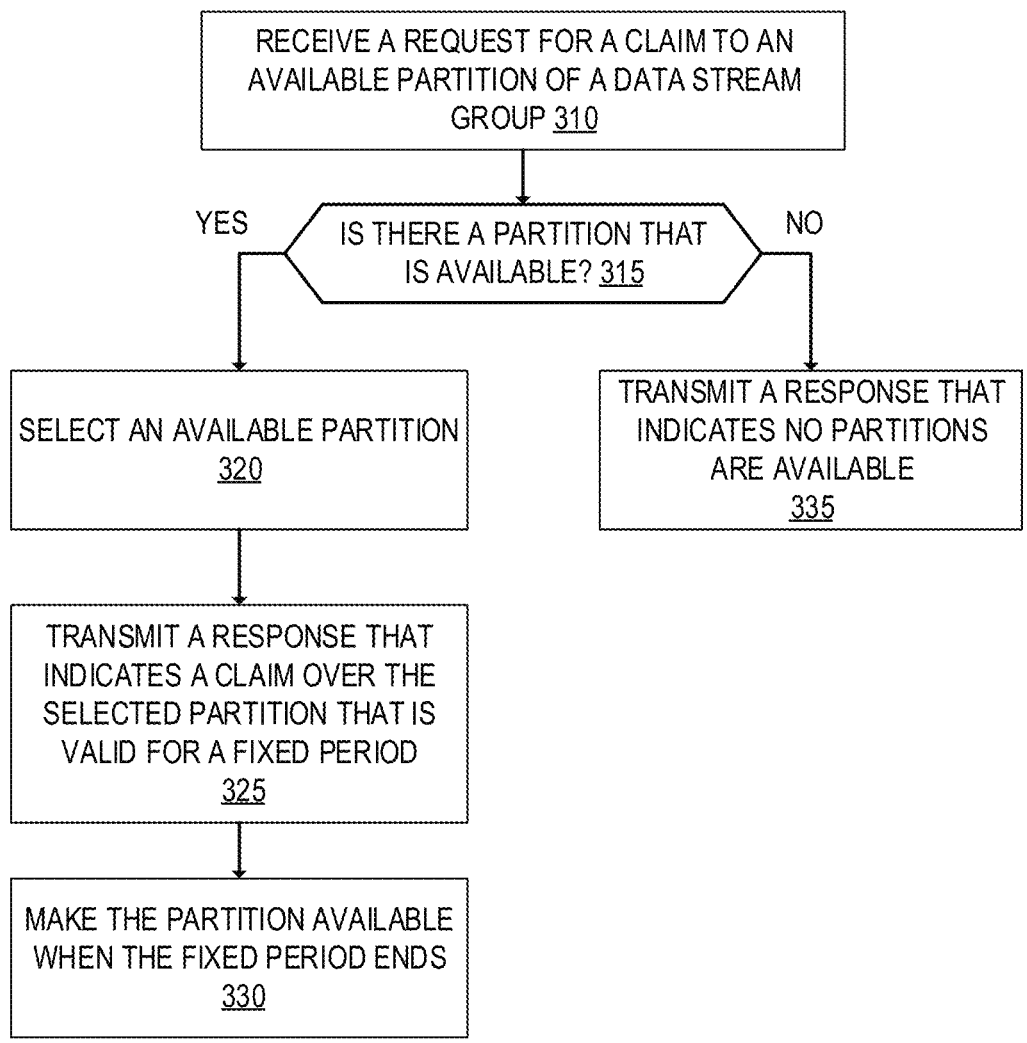
FIG. 3 is a flow diagram that illustrates operations for dynamically allocating partitions in a distributed data system according to an embodiment.

FIG. 3 is a flow diagram that illustrates operations for dynamically allocating partitions in a distributed data system according to an embodiment. The operations of FIG. 3 are described with respect to the exemplary embodiment of FIG. 1. However, the operations of FIG. 3 can be performed by different embodiments from that of FIG. 1, and the exemplary embodiment of FIG. 1 can perform different operations from that of FIG. 3.

At operation 310, the partition claim assignment service 130 receives a request for a claim to an available partition of the data stream group 112. This request is received from a consumer, such as the consumer 120A. This request does not typically indicate the specific partition that is requested, but rather requests any available partition. Next, at operation 315, the partition claim assignment service 130 determines whether there is an available partition. The partition claim assignment service 130 keeps track of the state of the partitions 115A-N of the data stream group 112, such as which partitions 115A-N are currently claimed, and optionally by what consumer currently holds the claim. If there is an available partition, then operation 320 is performed. If there is not an available partition, then operation 335 is performed where the partition claim assignment service 130 transmits a response to the requester that indicates that no partitions are available.

At operation 320, the partition claim assignment service 130 selects an available partition. The selection may be one of various techniques such as a round-robin selection of partitions, a random selection, or based on policy (e.g., select partition based on server load or server characteristic). The partition claim assignment service 130 may mark the selected partition as being claimed. Next, at operation 325, the partition claim assignment service 130 transmits a response that indicates a claim over the selected partition. The claim is valid for a fixed period. When the fixed period ends, then at operation 330, the partition claim assignment service 130 marks the partition as being available. A claim can then be given over that partition to another consumer.

Figure 4:
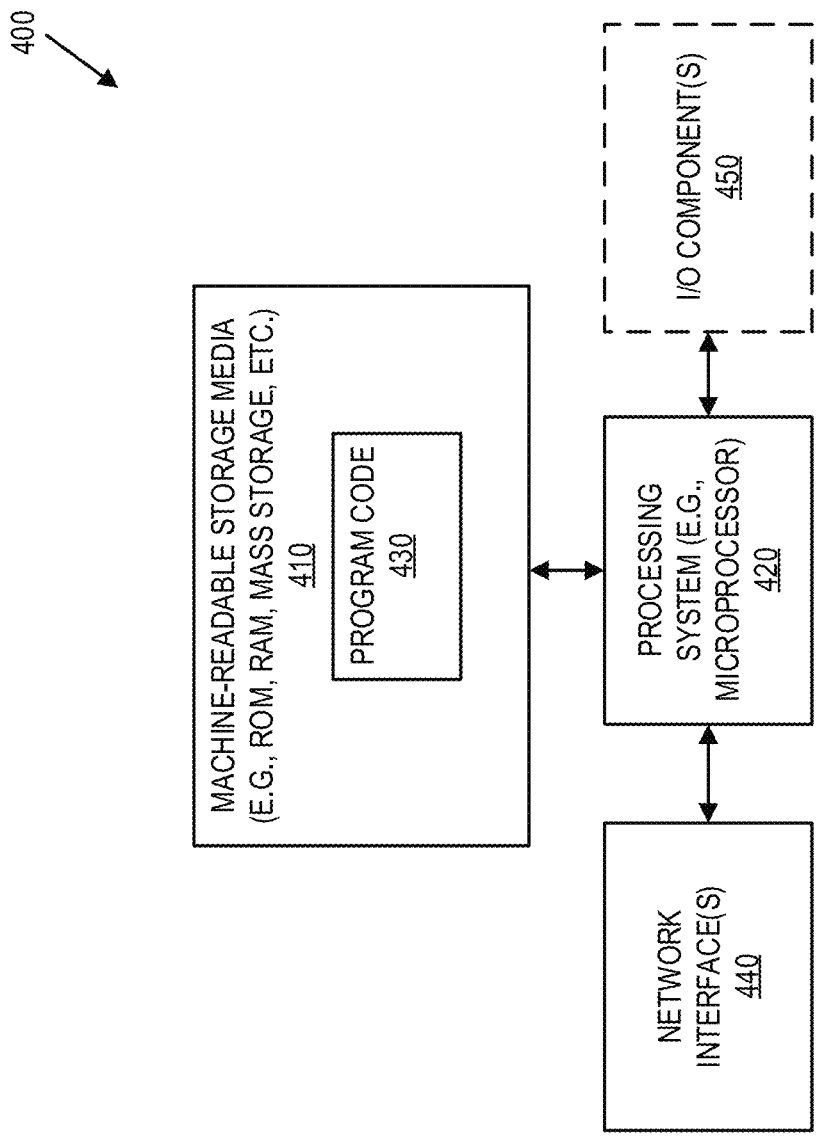
FIG. 4 is a block diagram illustrating a data processing system that can be used in an embodiment.

FIG. 4 illustrates a block diagram for an exemplary data processing system 400 that may be used in some embodiments. One or more such data processing systems 400 may be utilized to implement the embodiments and operations described with respect to the servers described herein. Data processing system 400 includes a processing system 420 (e.g., one or more processors and connected system components such as multiple connected chips).

The data processing system 400 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 410 (e.g., magnetic disks, optical disks, read only memory (ROM), flash memory devices, phase change memory) and machine-readable transmission media (also called a carrier) (e.g., electrical, optical, radio, acoustical or other form of propagated signals-such as carrier waves, infrared signals), which is coupled to the processing system 420. For example, the depicted machine-readable storage media 410 may store program code 430 that, when executed by the processing system 420, causes the data processing system 400 to execute the dynamic allocation of partitions, and/or any of the operations described herein.

The data processing system 400 also includes one or more network interfaces 440 (e.g., a wired and/or wireless interfaces) that allows the data processing system 400 to transmit data and receive data from other computing devices, typically across one or more networks (e.g., Local Area Networks (LANs), the Internet, etc.). The data processing system 400 may also include one or more input or output ("I/O") components 450 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 400, and, in certain embodiments, fewer components than that shown in One or more buses may be used to interconnect the various components shown in FIG. 4.

The techniques shown in the figures can be implemented using code and data stored and executed on one or more electronic devices (e.g., a server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals-such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth to provide a more thorough understanding of embodiments. It will be appreciated, however, by one skilled in the art that the invention may be practiced without such specific details. In other instances, control structures, gate level circuits and full software instruction sequences have not been shown in detail in order not to obscure understanding. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for processing data in a distributed system, the method comprising:
    granting a first claim over a first partition of a plurality of partitions to a first consumer of a plurality of consumers, wherein each of the plurality of partitions stores a different portion of the data, wherein each of the plurality of partitions are part of a same data stream group, wherein the first claim is valid for a first period, and wherein the first claim allows only the first consumer out of the plurality of consumers to consume data of the first partition during the first period;
    consuming, by the first consumer during the first period, the data in the first partition until the first claim expires or the data in the first partition is fully consumed by the first consumer, wherein the first consumer fully consumes the data of the first partition prior to the first claim expiring, and wherein the first claim is not released until the first claim expires;
    responsive to the first consumer fully consuming the data of the first partition prior to the first claim expiring, granting a second claim over a second partition of the plurality of partitions to the first consumer without releasing the first claim, wherein the second claim is valid for a second period, and wherein the second claim allows only the first consumer out of the plurality of consumers to consume data of the second partition during the second period;
    consuming, by the first consumer during the second period, the data in the second partition until the second claim expires or the data in the second partition is fully consumed by the first consumer;
    granting a third claim over the first partition to a second consumer of the plurality of consumers after the first claim expires, wherein the third claim is valid for a third period, and wherein the third claim allows only the second consumer out of the plurality of consumers to consume data of the first partition during the third period; and
    consuming, by the second consumer during the third period, the data in the first partition until the third claim expires or the data in the first partition is fully consumed by the second consumer.

2. The method of claim 1, wherein granting the first claim over the first partition includes:
    transmitting a partition claim request that asks for an available partition of the data stream group to consume; and
    receiving a partition claim response that indicates a grant of the first claim over the first partition to the first consumer.

3. The method of claim 2, wherein the first claim is given over any available partition of the data stream group.

4. The method of claim 1, wherein the first period, the second period, and the third period are each for a predefined length of time.

5. The method of claim 1, wherein the first period, the second period, and the third period each are defined by an expiration time.

6. The method of claim 1, wherein consuming the data in the first partition includes reading the data and sending the data to a database in parallel with the reading.

7. The method of claim 6, wherein the first consumer waits until all the read data has been sent to the database prior to making a request for a claim over another available partition of the data stream group to continue.

8. A system, comprising:
a first plurality of servers that each include a partition of a plurality of partitions that are part of a same data stream group;
a second plurality of servers that execute a plurality of consumer applications, wherein each consumer application is capable of performing operations including:
transmitting a first partition claim request that asks for a first available partition of the plurality of partitions to consume, wherein the first partition claim request indicates an identifier of the data stream group;
receiving a first partition claim response that indicates a first grant of a first claim over a first partition of the plurality of partitions, wherein the first claim is valid for a first period, and wherein the first claim allows this consumer to consume data of the first partition during the first period;
consuming, during the first period, data in the first partition until the first claim expires or the data in the first partition is fully consumed;
responsive to fully consuming the data of the first partition prior to the first claim expiring, transmitting a second partition claim request that asks for a second available partition of the plurality of partitions, wherein after the first claim expires the first partition is available to be claimed by any of the plurality of consumer applications;
receiving a second partition claim response that indicates a second grant of a second claim over a second partition of the plurality of partitions, wherein the second claim is valid for a second period, and wherein the second claim allows this consumer to consume data of the second partition during the second period; and
consuming, during the second period, data in the second partition until the second claim expires or the data in the second partition is fully consumed.

9. The system of claim 8, wherein the first claim is given over any available partition of the data stream group.

10. The system of claim 8, wherein the first period and the second period are each for a predefined length of time.

11. The system of claim 8, wherein the first period and the second period are each are defined by an expiration time.

12. The system of claim 8, wherein consuming the data in the first partition includes reading the data and sending the data to a database in parallel with the reading.

13. The system of claim 12, wherein the consumer waits until all the read data has been sent to the database prior to making a request for a claim over another available partition of the data stream group to continue.

14. A non-transitory machine-readable storage medium that provides instructions that, if executed by a processor of a server executing a consumer cause operations to performed comprising:
transmitting a first partition claim request that asks for a first available partition of a plurality of partitions that belong to a same data stream group to consume, wherein each of the plurality of partitions stores a different portion of data that belongs to the same data stream group, and wherein the first partition claim request indicates an identifier of the data stream group;
receiving a first partition claim response that indicates a first grant of a first claim over a first partition of the plurality of partitions, wherein the first claim is valid for a first period, and wherein the first claim allows the consumer to consume data of the first partition during the first period, wherein the consumer is one of a plurality of consumers;
consuming, during the first period, the data in the first partition until the first claim expires or the data in the first partition is fully consumed;
responsive to fully consuming the data of the first partition prior to the first claim expiring, transmitting a second partition claim request that asks for a second available partition of the plurality of partitions, wherein after the first claim expires the first partition is available to be claimed by any of the plurality of consumers;
receiving a second partition claim response that indicates a second grant of a second claim over a second partition of the plurality of partitions, wherein the second claim is valid for a second period, and wherein the second claim allows this consumer to consume data of the second partition during the second period; and
consuming, during the second period, data in the second partition until the second claim expires or the data in the second partition is fully consumed.

15. The non-transitory machine-readable storage medium of claim 14, wherein the first claim is given over any available partition of the data stream group.

16. The non-transitory machine-readable storage medium of claim 14, wherein the first period and the second period are each for a predefined length of time.

17. The non-transitory machine-readable storage medium of claim 14, wherein the first period and the second period are each are defined by an expiration time.

18. The non-transitory machine-readable storage medium of claim 14, wherein consuming the data in the first partition includes reading the data and sending the data to a database in parallel with the reading.

19. The non-transitory machine-readable storage medium of claim 18, wherein the consumer waits until all the read data has been sent to the database prior to making a request for a claim over another available partition of the data stream group to continue.

* * * * *